United States Patent [19]

Plischke et al.

[11] 4,312,719
[45] Jan. 26, 1982

[54] ELECTROCHEMICAL PROCESS FOR INCORPORATING COPPER IN NYLON

[75] Inventors: LeMoyne W. Plischke; Joseph M. Kiefer, both of Pensacola, Fla.

[73] Assignee: Monsanto Company, St. Louis, Mo.

[21] Appl. No.: 209,622

[22] Filed: Nov. 24, 1980

[51] Int. Cl.$^3$ .................. C25B 3/12; C08J 3/02; C08L 77/00

[52] U.S. Cl. .................. 204/72; 260/29.2 N; 528/9; 528/335; 528/346; 528/347

[58] Field of Search .............. 204/59 QM, 72, 74

[56] References Cited

U.S. PATENT DOCUMENTS

| | | | |
|---|---|---|---|
| 2,705,227 | 3/1955 | Stamatoff | 260/45.7 R |
| 3,573,180 | 3/1971 | Hodes et al. | 204/72 |
| 3,755,100 | 8/1973 | Epple | 204/74 |
| 3,821,170 | 6/1974 | Hanson | 204/72 R |
| 3,947,424 | 3/1976 | Tomek | 260/45.7 R X |
| 4,208,255 | 6/1980 | Stahl et al. | 204/72 |

OTHER PUBLICATIONS

Gilch et al., Chem. Abs., vol. 66 Abstract 46753p (1967).
I. M. Kolthoff et al., Textbook of Quantitative Inorganic Analysis, published by MacMillan Co., N.Y. (1951), pp. 150–152.
Encyclopedia Britannica, vol. 8, p. 261 (1972), William Benton, Publisher, Chicago, Ill.

*Primary Examiner*—F. Edmundson
*Attorney, Agent, or Firm*—John W. Whisler

[57] ABSTRACT

A process for dissolving copper in an aqueous nylon salt solution without dissolving other substances is provided by applying an electrical potential between two copper electrodes immersed in the solution. Upon melt polymerization of the salt solution, copper is incorporated into the resulting nylon. The amount of copper dissolved in the solution can be closely monitored and controlled.

11 Claims, No Drawings

ELECTROCHEMICAL PROCESS FOR INCORPORATING COPPER IN NYLON

BACKGROUND OF THE INVENTION

A. Field of the Invention

This invention relates to the electrolytic dissolution of a metal such as copper into an aqueous solution of polyamide-forming salt. Upon melt polymerization of the salt solution, the metal is incorporated into the resulting polyamide.

B. Description of the Prior Art

Nylon 66 and other synthetic linear polyamides are prepared by the melt polymerization of an aqueous solution of the appropriate polyamide-forming salt. Such polyamides are conventionally stabilized against heat degradation by dissolving a copper compound, such as copper acetate, in the aqueous salt solution prior to melt polymerization. Normally, an inorganic halide such as KBr or KI is also added to the aqueous salt solution to enhance the stabilizing effect of the copper compound (U.S. Pat. Nos. 2,705,227 and 3,947,424). Unfortunately, ions such as acetate, potassium, bromide and iodide ions act as impurities, that is, such ions tend to adversely effect melt polymerization, fiber formation and/or properties of the final polymer, for example, acetate anions function as chain terminators and limit the molecular weight of the final polymer and cations such as potassium may interfere with fiber processing (e.g. dyeing) or cause agglomeration of other additives which may be present for other purposes.

SUMMARY OF THE INVENTION

The present invention provides a process for dissolving a metal in an aqueous solution of polyamide-forming salt and comprises applying an electrical potential between an anode and a cathode which are spaced from one another and in contact with the solution, wherein the surface of the anode comprises at least one metal. The process is an electrochemical process in which the polyamide-forming salt serves as an electrolyte and by which electrolytic dissolution of a metal occurs at the anode and release of hydrogen occurs simultaneously at the cathode. In the case of copper the following reactions occur in accordance with accepted principles:

$$Cu^\circ \rightarrow Cu^{++} + 2e^- \text{ (anode)}$$

$$2H^+ + 2e^- \rightarrow H_2 \uparrow \text{ (cathode)}$$

The amount of metal dissolved in the salt solution at the anode and the amount of hydrogen released at the cathode are functions of the amperage of the electrical potential between the anode and cathode and can be accurately controlled and, if desired, can be controlled by means of a computer. In carrying out the process of the invention steps are preferably taken to avoid potentially explosive conditions at the cathode, such as, blanketing the solution with an inert atmosphere such as nitrogen or removing hydrogen as it is released at the cathode, such as by vacuum.

The present invention permits metal ions, such as copper ions to be dissolved in an aqueous solution of the polyamide-forming salt without introducing undesirable ions in the solution which upon melt polymerization of the solution are incorporated into the resulting polyamide.

DESCRIPTION OF THE PREFERRED EMBODIMENTS

In carrying out the process of the invention any polyamide-forming salt may be used as the electrolyte. Typically, the salts are referred to as nylon salts and are formed by reacting in water stoichiometric amounts of one or more aliphatic diamines of the formula $NH_2$—R—$NH_2$ with one or more dicarboxylic acids of the formula HOOC—R'—COOH, where R is

and R' is

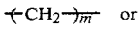 or

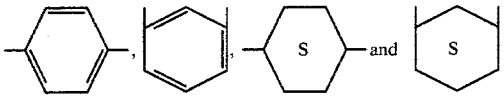

in which

represents a cyclohexane ring, n is an integer from 2 to 12 and m is an integer from 4 to 12. Representative salts include hexamethylenediammonium adipate (nylon 66 salt), terephthalate (nylon 6TA salt), azelate (nylon 69 salt), sebacate (nylon 610 salt), etc. If desired a supporting electrolyte may be added to the aqueous salt solutions, such as, ammonium carbonate, sodium chloride, etc. Preferably, the supporting electrolyte when used is a material which does not adversely effect processing or the properties of the resulting polyamide, such as, ammonium carbonate.

The selection of anode and cathode materials, the arrangement of the electrodes in the salt solution and the source and magnitude of the electrical potential needed to dissolve the anode metal will be apparent to those skilled in the art. The anode may be fabricated entirely of the metal to be dissolved in the salt solution or its surface may merely comprise the metal, for example, as a coating. If the surface of the anode comprises more than one metal, the metal having the highest oxidation potential ($E^\circ_{ox}$) will be dissolved in preference to other metals present at the surface. Materials which may be used in fabricating the electrodes include: carbon or graphite, stainless steel, platinum, copper, magnesium, etc. The electrodes may be in the form of screens, rods, pipes, plates, etc. or the vessel itself may serve as one of the electrodes and may be spaced from in any suitable manner, for example, the electrodes may consist of a plurality of spaced rods or two pipes of different diameters arranged with the smaller diameter pipe concentrically positioned inside the larger diameter pipe. In general, with other parameters remaining constant, increasing the surface area of the electrodes in contact with the salt solution ($S^2$) results in an increase in the rate at which the anode metal is dissolved. Also, the voltage required to maintain a given amperage was found to decrease as the surface area ($S^2$) increased or as the distance between the electrodes decreased. The electrical potential may be applied by means of a direct current (dc) power source or alternating current (ac) power source. In a preferred embodiment of the invention, the anode and cathode are each fabricated entirely of the metal to be dissolved in the salt solution and the electrical potential is applied by means of a dc power source with the direction of the current being periodically reversed to prevent the anode from becoming passified. Passification of the anode causes a noticeable reduction in the rate at which the metal is dissolved and could in time cause the rate to approach or become zero.

It is contemplated that any metal may be dissolved in a polyamide salt solution in accordance with the invention. However, it is recognized that passification (such as by chemical treatment) of metals such as sodium, lithium and potassium would be required to prevent hazardous conditions. On the other hand, high electrical potentials would be required to dissolve metals such as silver. Metals which are of particular interest with respect to their incorporation in polyamides include antimony, copper, magnesium, manganese, and zirconium with copper being perhaps of the most interest at this time.

The following examples are given to further illustrate the invention.

EXAMPLE 1

In this example experiments were carried out in which an anode and cathode were immersed in 250 ml of an aqueous solution of nylon 66 salt contained in a 400 ml glass beaker equipped with a magnetic stirring bar. The concentration of the salt solution was about 48.5% by weight salt. The composition of the anode and cathode are given in Table I. In each experiment an electrical potential was applied between the anode and cathode by means of two 7.5 volt batteries arranged in series. The salt solution was agitated by means of the stirring bar. At the end of each run the solution was analyzed and the concentration of the anode metal in the solution was determined and is expressed in Table I in terms of micrograms ($\mu$g) of metal per milliliter (ml) of solution.

TABLE I

| Run | Anode | Cathode | Time (min) | Milliamps | Anode Metal Dissolved $\mu$g/ml |
|---|---|---|---|---|---|
| 1 | Cu | Pt | 3 | 490 | 23 |
| 2 | Cu | Pt | 5 | N/A[1] | 25 |
| 3[2] | Cu | Pt | 20 | N/A | 6 |
| 4 | Cu | Cu | 2.5 | 600 | 25 |
| 5 | Cu | Al | 20 | N/A | 48 |
| 6 | Cu | S/S[3] | 20 | N/A | 59 |
| 7 | Mg | Pt | 3 | 300 | 24 |
| 8 | Mg | Pt | 20 | 170 | 119 |
| 9 | Zn | Pt | 20 | 20 | 22 |
| 10 | Ni | Pt | 5 | 440 | 2.1 |
| 11 | Ni | Pt | 20 | 420 | 6.2 |
| 12 | Mn | Pt | 20 | N/A | 16 |
| 13 | Cu | Pd | 20 | N/A | 57 |

[1]N/A means not available
[2]Salt solution contained 0.63 g of KBr
[3]S/S stands for stainless steel Run 3 indicates that the presence of a salt such as KBr, currently added to nylon salt to enhance dissolution of added copper compounds (e.g. copper acetate), suppresses the dissolution of the copper by the process of the invention.

EXAMPLE 2

The metal-containing salt solution obtained from Runs 6, 8 and 11–13 in Example 1 were each melt polymerized in an autoclave and melt spun through a spinneret attached to the bottom of the autoclave to provide filaments. Analysis of the polymer gave the following results:

TABLE II

| Polymer Derived From Solution of Example 1 Run | Metal/ppm |
|---|---|
| 6 | Cu/128 |
| 8 | Mg/260 |
| 11 | Ni/4 |
| 12 | Mn/40 |
| 13 | Cu/83 |

EXAMPLE 3

In this example, experiments were carried out as described in Example 1, except that the direction of the current was reversed periodically. The results of the experiments are given in Table III. Runs 1 and 2 are given for purposes of comparison. In these runs the direction of the current was not reversed. In Run 3, as shown in Table III, the current was reversed after the first 4 minutes, again after the next 6 minutes, again after the next 4 minutes, and finally again after the next 2 minutes. In Run 4 the current was reversed more frequently. Runs 2, 3 and 4 each lasted for a total of 20 minutes.

TABLE III

| Run | Anode | Cathode | Exposure Time (min)/Direction of Current ($\rightleftarrows$) | Anode Metal/amt Dissolved in $\mu$g/ml |
|---|---|---|---|---|
| 1 | Cu | Cu | 2.5/ $\rightarrow$ | 25 |
| 2 | Cu | Cu | 20/ $\rightarrow$ | 55 |
| 3 | Cu | Cu | 4/ $\rightarrow$ 6/ $\leftarrow$ 4/ $\rightarrow$ 4/ $\leftarrow$ 2/ $\rightarrow$ | 120 |
| 4 | Cu | Cu | 2/ $\rightarrow$ 3/ $\leftarrow$ 3/ $\rightarrow$ 3/ $\leftarrow$ 3/ $\rightarrow$ 3/ $\leftarrow$ 3/ $\rightarrow$ | 150 |
| 5 | Mg | Mg | 6/ $\rightarrow$ 6/ $\leftarrow$ 6/ $\rightarrow$ 2/ $\leftarrow$ | 149 |

The results of Table III show that by reversing the current passification of the anode is reduced, thereby increasing the amount of anode metal dissolved. The results indicate that, as the period between reversals is reduced, the amount of metal dissolved increases.

EXAMPLE 4

In this example, the dissolution of copper into nylon 66 salt solution was examined as a function of time.

To a stainless steel tank equipped with an agitation was added 55 gallons (208.175 l) of an aqueous solution of nylon 66 salt. The concentration of the salt was about 48.55% by weight. The electrodes were composed of electrolytic grade copper and provisions were made to reverse the direction of the current every minute during operation. Each electrode had an area of 119.8 cm$^2$ exposed to the solution and the distance between electrodes was 4.445 cm. The process was run for 80 minutes during which time solution was periodically analyzed to determine the amount of copper that had dissolved in the solution since operation. The solution was maintained at 32° C. ±1° C., the current was maintained at 40 amps and the voltage at 19 volts ±0.5 volts. The results of the experiment are given in Table IV.

TABLE IV

| Time (min.) | Cu (µg/ml) |
|---|---|
| 10 | 10 |
| 15 | 12 |
| 20 | 16 |
| 25 | 20 |
| 30 | 24 |
| 45 | 34 |
| 70 | 52 |
| 80 | 61 |

EXAMPLE 5

This example illustrates a large scale application of the process of the invention.

An aqueous solution of nylon 66 salt (48.55% by weight) containing about 1300 ppm of dissolved copper was prepared in accordance with the process of this invention using the following equipment: (1) a polyethylene vessel (33.7 cm high×21 cm in diameter), (2) a bi-polar cell consisting of six copper electrodes (measuring 24.1 cm×7.6 cm×0.6 cm in the solution) separated by 0.3 cm Teflon spacers of 0.6 cm in width and (3) a positive displacement pump capable of delivery 2.8 l of solution per minute. The current was supplied to the electrodes by means of d.c. rectifier equipped with a timer for reversing the current every minute. Ten liters of nylon salt solution was charged to the vessel. In operation, the solution was maintained at 35° C. and was pumped from the vessel through the pump and back to the vessel and through the bi-polar cell. About 2591 ppm of copper, based on the theoretical conversion of salt to polymer, were dissolved in the solution during the run which lasted one hour. A total of 85 batches (copper-containing salt solutions) were prepared. Each batch was diluted with an equal volume (10 l) of virgin nylon 66 salt solution and then the diluted batches were combined. Analysis of each individual diluted solution prior to combining the solutions showed the combined salt solutions contained 1301 ppm copper on w.o.p. (weight of polymer).

In preparation of polymer, 1148 lbs. (521.2 Kg) of the above salt solution was diluted with 21,380 lbs. (9706.5 Kg) of virgin nylon 66 salt solution (50%) to provide a total of 22,528 lbs. of solution, which on conversion to polymer would theoretically produce 9717 lbs. (4411.5 Kg) of polymer containing 66 ppm copper. Three of these solutions were used in producing 29,150 lbs. (13,234.1 Kg) of 1260 denier/210 filament yarn. The yarn was produced on commercial equipment by a process in which the melt polymerization and melt spinning operations were coupled. For purposes of comparison, a like amount of yarn was produced under the same conditions except that the copper was incorporated in the yarn by adding an appropriate amount of cupric acetate to the salt solution (Control Yarn) instead of by the electrolytic dissolution process of the present invention (Test Yarn). The physical properties of both yarns were comparable. However, the amount of $CO_2$ sweep required in the finisher to attain a relative viscosity (RV) of about 76.5 was significantly less with the Test yarn than with the Control yarn—14.3% less. In terms of large scale operations this represents a significant saving in cost.

EXAMPLE 6

In this example, runs were made under the conditions described in Example 1 except that in certain of the runs instead of using direct current (i.e. two 7.5 volt batteries in series) 110 volt, 60-cycle alternating current was used.

TABLE V

| Run | Anode | Cathode | Time (min) | Current | Volts | Cu dissolved (µg/ml) |
|---|---|---|---|---|---|---|
| 1 | Cu | Pt | 3 | DC | 15 | 23 |
| 2 | Cu | Pt | 20 | DC | 15 | 64 |
| 3 | Cu | Pt | 10 | AC | 25 | 83 |
| 4 | Cu | Pt | 20 | AC | 15 | 132 |
| 5 | Cu | Cu | 2.5 | DC | 15 | 25 |
| 6 | Cu | Cu | 20 | DC | 15 | 55 |
| 7 | Cu | Cu | 20 | AC | 7.5 | 19 |
| 8 | Cu | Cu | 20 | AC | 10 | 20 |
| 9 | Cu | Cu | 20 | AC | 15 | 61 |

EXAMPLE 7

In this example three individual runs were made using the equipment described in Example 5 except in this instance 5 copper electrodes were used instead of 6. In each run a sufficient amount of the specified polyamide-forming monomer was dissolved in 10,000 ml of water to obtain the solutions as indicated in Table VI. The direction of the current was reversed every minute and the amount of copper dissolved after one hour was determine and is given in Table VI.

TABLE VI

| Monomer Solution | Cu Dissolved (µg/ml) |
|---|---|
| 70% ε-caprolactam (does not ionize in $H_2O$) | 4 |
| 30% hexamethylene diammonium azelate | 819 |
| 50% hexamethylene diammonium adipate | 2081 |

The results in Table VI show that the amount of copper dissolved increases with the ability of the monomer to ionize in water. It would be expected that more copper would be dissolved in nylon salt solutions such as aqueous solutions of nylon 65 salt and nylon 64 salt since these salts are even more soluble in water than nylon 66 salt.

We claim:

1. A process for dissolving a metal in an aqueous solution of polyamide-forming salt, comprising applying an electrical potential between an anode and a cathode which are spaced from one another and in contact with said solution, wherein the surface of the anode comprises said metal and wherein said potential is of sufficient magnitude to dissolve said metal.

2. The process of claim 1 wherein the surface of said anode consists essentially of a metal selected from the group consisting of copper, magnesium, zinc, nickel, manganese, zirconium.

3. The process of claim 1 wherein the electrical potential is applied by means of an alternating current power source.

4. The process of claim 1 wherein the electrical potential is applied by means of a direct current power source.

5. The process of claim 1 wherein a supporting electrolyte is added to said solution.

6. The process of claim 1 wherein the polyamide-forming salt is the reaction product of stoichiometric amounts of a diamine of the formula $NH_2$—R—$NH_2$ and an acid of the formula HOOC—R'—COOH where R is

and R' is

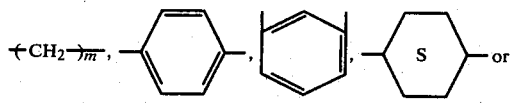

in which n is 2 to 12, m is 4—12 and

represents a cyclohexane ring.

7. The process of claim 1 wherein said polyamide-forming salt is hexamethylenediammonium adipate.

8. The process of claim 7 wherein said anode consists essentially of copper.

9. The process of claim 8 wherein said cathode consists essentially of copper.

10. The process of claim 9 wherein the electrical potential is applied by means of a direct current power source.

11. The process of claim 10 wherein the direction of the current is periodically reversed.

* * * * *